United States Patent Office 3,442,659
Patented May 6, 1969

3,442,659
BREAD IMPROVING AGENTS
Robert J. Baeuerlen, Park Forest, and Thomas W. Findley, La Grange, Ill., assignors to Swift & Company, Chicago, Ill., a corporation of Illinois
No Drawing. Filed Aug. 12, 1966, Ser. No. 571,971
Int. Cl. A21d 13/08, 13/00
U.S. Cl. 99—91                    13 Claims This invention relates in general to the production of yeast leavened baked flour products such as bread, rolls, crackers, sweet rolls, pastry, coffee cakes and the like. More particularly, this invention relates to processes wherein certain improving agents, namely, glycosides of hydroxy fatty acids, are incorporated into the dough prior to baking, for the purpose of improving the properties of the dough itself, and also the finished product.

It has long been a problem in the manufacture of yeast leavened baker flour products to overcome certain "uncontrollable elements" which are inherent in the manufacture of these products and which result in products of variable quality. Exemplary of these "uncontrollable" elements are variations in mixing requiriments of the flour used; differences in wheat used which is caused by different varieties and regional variations in wheat or variations in wheat from one crop year to the next; and milling variations caused by such factors as differences in equipment used in the milling, different methods and concepts in milling, atmospheric conditions at the time of milling and the conditions of the milling equipment. In their attempt to overcome these factors and produce uniform high quality products, millers and bakers have gone to considerable effort and expense. Various "improvers" have been added to the flour and the dough such as oxidizing agents, bleaching agents, and dough conditioners. But, variations in quality still occur and cause the industry great expense.

It is, therefore, the principal object of this invention to provide a method for producing yeast leavened baked flour products which have a larger volume and greater uniformity of shape and appearance.

It is a further object of this invention to provide an "improver" which will give "tolerance" to bread mixed over a broad range of mixing speeds and times. And, more particularly, to provide an "improver" which will allow for higher mixing speeds which will thus result in a faster output of product.

Additional objects, if not specifically pointed out herein, will be readily apparent to one skilled in the art from the following detailed description.

In general, the present invention contemplates embodying small quantities of glycosides of hydroxy fatty acids in the dough of the baked flour product prior to baking. This addition of the improving agent to the dough can be carried out by incorporating the agent in the form of a mixture with the dry flour or in the water phase of the dough. Alternatively, the improving agent may be incorporated in the shortening for use in the bakery goods, as, for example, lard, compound and other dry shortenings conventionally used in the baking process.

The improving agents utilized in the practice of this invention, namely, glycosides of hydroxy fatty acids, generally adhered to the following formula:

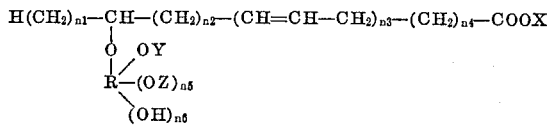

wherein $n_1$ and $n_2$ are integers from 0 to 16; $n_3$ is an integer from 0 to 3; when $n_3$ is an integer other than 0 then $n_4$ is an integer from 0 to 6; when $n_3$ is 0 then $n_4$ is 0; and $n_1+n_2+3n_3+n_4=$an integer from 10 to 18; $n_5$ is an integer from 0 to 1; $n_6$ is an integer from 1 to 4; R is a glycoside containing 5 to 6 carbon atoms; X is selected from the group consisting of hydrogen, sodium, calcium, potassium and magnesium; Z is selected from the group consisting of hydrogen and acetyl radicals; and Y is selected from the group consisting of hydrogen and

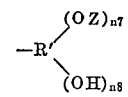

wherein R' is a glycoside containing 5 to 6 carbon atoms; $n_7$ is an integer from 0 to 1; and $n_8$ is an integer from 1 to 4.

Methods for preparing compounds of the above general formula are disclosed in Gorin et al., "Hydroxy Fatty Acid Glycosides of Sophorose from Torulopsis Magnoliae," Canadian J. Chem., vol. 39 (1961), and Tulloch et al., "Fermentation of Long Chain Compounds by Torulopsis Magnoliae," Canadian J. Chem., vol. 40 (1962). Therefore, a detailed description of methods of manufacture of these compounds is deemed unnecessary.

It is to be noted that the fatty acid portion of the glycosides of hydroxy fatty acids, described in the above general formula, may be saturated or unsaturated. Suitable hydroxy fatty acids which may be employed in preparing the glycosides include hydroxy fatty acids derived from animal fats and hydroxy fatty acids derived from vegetable fats. An, also, though the range $n_1+n_2+3n_3+n_4$ may be from 10–18 carbon atoms, in a preferred embodiment of the present invention $n_1+n_2+3n_3+n_4$ will be in a range of from 12–16 carbon atoms. Also, it should be noted that mixtures of the various improving agents identified within the general formula above, as well as the individual improving agents below, may be utilized pursuant to this invention.

It has been found to be particularly advantageous to utilize as improving agents in the process of the present invention sophorosides of hydroxy fatty acids of the general formula:

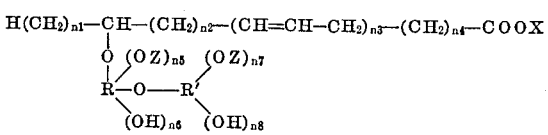

wherein $n_1$ and $n_2$ are integers from 0 to 16; $n_3$ is an integer from 0 to 3; when $n_3$ is an integer other than 0 then $n_4$ is an integer from 0 to 6; when $n_3$ is 0 then $n_4$ is 0; and $n_1+n_2+3n_3+n_4=$an integer from 10 to 18; $n_5$ is an integer from 0 to 1; $n_6$ is an integer from 1 to 4; R and R' are glycosides containing 5 to 6 carbon atoms; X is selected from the group consisting of hydrogen, sodium, calcium, potassium and magnesium; and Z is selected from the group consisting of hydrogen and acetyl radicals; $n_7$ is an integer from 0 to 1; and $n_8$ is an integer from 1 to 4.

Exemplary of specific improving agents which may be utilized pursuant to the present invention are partially acetylated and deacetylated sophorosides of tallow fatty acids (tallow fatty acids comprising palmitic acid, stearic acid, myristic acid, oleic acid and linoleic acid); partially aetylated and deacetylated sophorosides of oleic acid; partially acetylated and deacetylated sophorosides of linoleic acid; partially acetylated and deacetylated mono-glycosides of lauric acid, partially acetylated and deacetylated mono-glycosides of myristic acids; partially acetylated and deacetylated monoglycosides of palmitic acid; partially acetylated and deacetylated mono-glycosides of stearic acid; partially acetylated and deacetylated mono-glycosides of arachidic acid; and mixtures thereof.

The amount of improving agent to be added is somewhat variable, it being understood that the different compounds to be added will usually be found to have slightly different efficacies. In all cases, however, the proportion of agent to be added is quite small. In most cases, good results are obtained with the use of from about 0.01% to about 2% of the improving agent based on the total weight of the flour in the bread formula; with a preferred range of from about 0.1% to about 1%. It is rarely necessary to exceed about 2%, although amounts in excess of about 2% may be utilized within the scope of this invention, however, the increase in the resulting yields usually will not be commensurate with the increased expense.

The following examples which are intended to be illustrative only, and are in no manner to be construed as limiting the invention, show the preparation of a yeast leavened baked flour product according to the method of this invention and the benefits derived from the addition of the improving agent.

Example I

In order to demonstrate the effectiveness of the improving agents of the invention, a series of breads were prepared. One lot contained no improving agent (control) and the other lot contained 0.5% (based on weight of flour) of deacetylated sophorosides of tallow fatty acids prepared as described in the above identified articles.

The following continuous bread formula was used:

Brew:
  Flour _____ grams__ 6,000
  Water _____ do____ 3,880
  Sugar _____ do____ 480
  Salt _____ do____ 135
  Yeast _____ do____ 210
  Acid phosphate _____ do____ 4
  Fermaloid _____ do____ 30
Oxidizers (based on flour):
  Potassium iodate _____ p.p.m__ 8
  Potassium bromate _____ do__ 48
Water (to dissolve oxidizers) _____ grams__ 200

The shortenings for the two lots were as follows:
Lot 1—lard+8% mono-glyceride (based on weight of lard) _____ grams__ 200
Lot 2—lard _____ do____ 200

Lot 1 and Lot 2 are fermented and baked in an identical manner except that the improving agent, deacetylated sophorosides of tallow fatty acids, was incorporated into the dough in Lot 2. Improving agent in an amount of about 0.5% (based on the weight of flour) was dissolved in the water utilized in formulating the "brew" and was thus added to the dough by way of this water.

The fermentation and baking of the bread was carried out by the following process. The "brew" was permitted to ferment at 74–78° F. with constant agitation for about 1½ hours. After this fermentation, the "brew" was added to the flour, the oxidizers (which had previously been dissolved in water) and the shortening. This combination was then mixed on a conventional type baker's mixer until all of the flour was wetted and the mixture was fairly homogeneous (the gluten was not developed). This "under-mixed" dough was then fed into the hopper of a continuous mixer, extruded into a mixing chamber, mixed and extruded into bread pans. The dough was then proofed and baked in the conventional manner.

The mixing speed in the mixing chamber was recorded for each bread sample and the volume and quantity of the finished bread product was also recorded in order to compare the mixing tolerance of the control group with the mixing tolerance of the group containing the improving agent, and also to compare the quality of the product. The results are set forth in the following table:

TABLE 1

| Percent sophoroside used | Mixing speed (r.p.m.) | Loaf volume (avg. 3 loaves) (cc.) | Loaf appearance |
|---|---|---|---|
| None (control) | 150 | 2,050 | Undermixed, distorted. |
| Do | 170 | 2,200 | Good but variable. |
| Do | 190 | 2,300 | Do. |
| Do | 210 | 2,160 | Distorted, overmixed. |
| Do | 230 | 2,000 | Do. |
| Do | 280 | 1,960 | Distorted, badly overmixed. |
| .50% DSTA [1] | 130 | 2,140 | Slightly undermixed. |
| Do | 150 | 2,280 | Good, uniform. |
| Do | 170 | 2,300 | Do. |
| Do | 190 | 2,350 | Do. |
| Do | 210 | 2,350 | Do. |
| Do | 230 | 2,280 | Do. |
| Do | 250 | 2,300 | Do. |
| Do | 280 | 2,000 | Distorted, overmixed. |

[1] The deacetylated sophoroside of tallow fatty acids (percent basis flour content).

These results demonstrate the improved mixing tolerance and quality of product when the improving agent is added as compared with bread prepared by the standard technique without the improving agent. It should be noted that the bread dough containing the improving agent produced good results over the broad range of mixing speeds from about 150–250 r.p.m.'s while the control loaves were considered satisfactory only from about 170 to about 190 r.p.m.'s.

Mixing tolerance can be of economic importance to the continuous bread baker who wishes to increase the output of his automated equipment by pushing product through at a faster rate or who wishes to maintain his current rate of output but slow down his mixer speed, thus saving on wear and tear and maintenance on his expensive mixing head and chamber. Thus, the improved mixing tolerance which the improvers of the present invention provide is of major importance. Also, it should be noted from the above example that the loaves containing the improving agent were more uniform from loaf to loaf and were of greater volume than were the control loaves. Of major importance is the fact that the "proofed" doughs (ready to go into the oven) are more stable and less subject to dough collapses due to jarring as commonly happens in the commercial mechanical conveying equipment when the improving agents of the present invention are added to the dough.

Example II

To demonstrate the effect of various levels of improving agent upon bread volume and mixing tolerance, a series of breads were prepared containing varying levels of improving agent ranging from control samples containing no improving agent to samples containing 2% (based on weight of flour) of the improving agent. The improving agent utilized in this test was deacetylated sophorosides of tallow fatty acids. The bread samples were prepared by the method of Example I. The results are shown in the following table:

TABLE 2

| Percent sophoroside used [1] | Mixing speed (r.p.m.) | Loaf volume (avg. 3 loaves) (cc.) |
|---|---|---|
| None | 150 | 2,050 |
| .125 | 150 | 2,270 |
| .25 | 150 | 2,300 |
| .50 | 150 | 2,280 |
| 1.00 | 150 | 2,320 |
| 2.00 | 150 | 2,320 |
| None | 190 | 2,300 |
| .125 | 190 | 2,350 |
| .25 | 190 | 2,350 |
| .50 | 190 | 2,370 |
| 1.00 | 190 | 2,360 |
| 2.00 | 190 | 2,300 |

[1] Deacetylated sophoroside of tallow fatty acid (percent basis flour content).

It is apparent from this data that the improving agent of the present invention is functional over a wide range of uses, and provides an improved product throughout this range at varying mixing speeds.

Obviously many modifications and variations of the invention as hereinbefore set forth may be made without departing from the spirit and scope thereof, and therefore only such limitations should be imposed as are indicated in the appended claims.

We claim:

1. A method for the production of improved yeast leavened baked flour products which comprises: incorporating into the dough an effective amount of glycosides of hydroxy fatty acids of the formula:

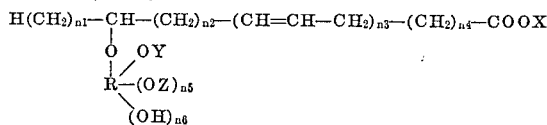

wherein $n_1$ and $n_2$ are integers from 0 to 16; $n_3$ is an integer from 0 to 3; when $n_3$ is an integer other than 0 then $n_4$ is an integer from 0 to 6; when $n_3$ is 0 then $n_4$ is 0; and $n_1 + n_2 + 3n_3 + n_4 =$ an integer from 10 to 18; $n_5$ is an integer from 0 to 1; $n_6$ is an integer from 1 to 4; R is a glycoside containing 5 to 6 carbon atoms; X is selected from the group consisting of hydrogen, sodium, calcium, potassium and magnesium; Z is selected from the group consisting of hydrogen and acetyl radicals; and Y is selected from the group consisting of hydrogen and

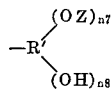

wherein R' is a glycoside containing 5 to 6 carbon atoms; $n_7$ is an integer from 0 to 1; and $n_8$ is an integer from 1 to 4.

2. The method of claim 1 wherein the glycosides of hydroxy fatty acids are sophorosides of hydroxy fatty acids of the formula:

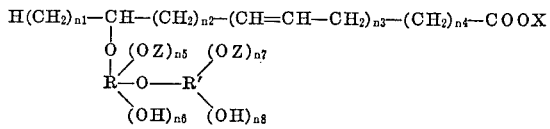

wherein $n_1$ and $n_2$ are integers from 0 to 16; $n_3$ is an integer from 0 to 3; when $n_3$ is an integer other than 0 then $n_4$ is an integer from 0 to 6; when $n_3$ is 0 then $n_4$ is 0; and $n_1 + n_2 + 3n_3 + n_4 =$ an integer from 10 to 18; $n_5$ is an integer from 0 to 1; $n_6$ is an integer from 1 to 4; R and R' are glycosides containing 5 to 6 carbon atoms; X is selected from the group consisting of hydrogen, sodium, calcium, potassium and magnesium; and Z is selected from the group consisting of hydrogen and acetyl radicals; $n_7$ is an integer from 0 to 1; and $n_8$ is an integer from 1 to 4.

3. The method of claim 1 wherein the hydroxy fatty acids are derived from animal fats.

4. The method of claim 1 wherein the hydroxy fatty acids are derived from vegetable fats.

5. The method of claim 1 wherein the glycosides of hydroxy fatty acids are sophorosides of tallow fatty acids.

6. The method of claim 1 wherein glycosides of hydroxy fatty acids are sopohorsides of stearic acid.

7. The method of claim 1 wherein the glycosides of hydroxy fatty acids are sophorosides of palmitic acid.

8. The method of claim 1 wherein the glycosides of hydroxy fatty acids are sophorosides of oleic acid.

9. The method of claim 1 wherein mixtures of glycosides of hydroxy fatty acids are utilized.

10. The method of claim 1 wherein the glycosides of hydroxy fatty acids are incorporated in the dough in an amount of at least about 0.01% (based on the total weight of the flour in the baked flour product formula).

11. The method of claim 1 wherein the yeast leavened product is bread.

12. The method of claim 1 wherein the yeast leavened product is selected from the group consisting of rolls, crackers, sweet rolls, pastry and coffee cakes.

13. A method for the production of improved bread products which comprises: incorporating into dough in an amount from about 0.01% to about 2% (based on the total weight of the flour in the bread formula) sophorosides of hydroxy fatty acids of the formula:

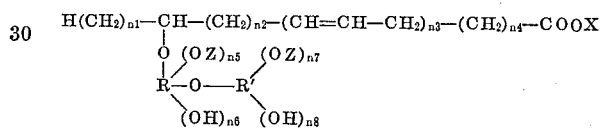

wherein $n_1$ and $n_2$ are integers from 0 to 16; $n_3$ is an integer from 0 to 3; when $n_3$ is an integer other than 0 then $n_4$ is an integer from 0 to 6; when $n_3$ is 0 then $n_4$ is 0; and $n_1 + n_2 + 3n_3 + n_4 =$ an integer from 10 to 18; $n_5$ is an integer from 0 to 1; $n_6$ is an integer from 1 to 4; R and R' are glycosides containing 5 to 6 carbon atoms; X is selected from the group consisting of hydrogen, sodium, calcium, potassium and magnesium; and Z is selected from the group consisting of hydrogen and acetyl radicals; $n_7$ is an integer from 0 to 1; and $n_8$ is an integer from 1 to 4.

References Cited

UNITED STATES PATENTS 3,293,272 12/1966 Freund _____ 99—91
3,312,684 4/1967 Spencer et al. _____ 260—210

RAYMOND N. JONES, *Primary Examiner.*

JAMES R. HOFFMAN, *Assistant Examiner.*

U.S. Cl. X.R.

99—92